United States Patent [19]

Herzog

[11] Patent Number: 4,523,450
[45] Date of Patent: Jun. 18, 1985

[54] METHOD OF CALIBRATING PROBE PINS ON MULTICOORDINATE MEASUREMENT MACHINES

[75] Inventor: Klaus Herzog, Oberkochen, Fed. Rep. of Germany

[73] Assignee: Carl-Zeiss-Stiftung, Heidenheim/Brenz, Oberkochen, Fed. Rep. of Germany

[21] Appl. No.: 420,104

[22] Filed: Sep. 20, 1982

[30] Foreign Application Priority Data

Nov. 7, 1981 [DE] Fed. Rep. of Germany ....... 8132664

[51] Int. Cl.³ .............................................. G01C 25/00
[52] U.S. Cl. ........................................ 73/1 J; 33/502; 33/503; 33/505
[58] Field of Search ............ 73/1 J; 33/174 H, 174 R, 33/174 PC, 185 R, 168 R

[56] References Cited

U.S. PATENT DOCUMENTS 3,711,929 1/1973 Blakey .............................. 33/174 R
3,869,799 3/1975 Neuer .
4,168,576 9/1979 McMurtry ...................... 33/174 PC
4,364,182 12/1982 Jones ..................................... 73/1 J

FOREIGN PATENT DOCUMENTS 1445977 8/1976 United Kingdom .

OTHER PUBLICATIONS

"Gauging and Probing Systems for Multicoordinate Measuring Instruments" by Klaus Herzog, Sep. 14, 1977; Institute for Production Engineering and Automation.

Primary Examiner—Charles E. Frankfort
Assistant Examiner—Denis E. Corr
Attorney, Agent, or Firm—Hopgood, Calimafde, Kalil, Blaustein & Judlowe

[57] ABSTRACT

This invention contemplates a rapid method of calibrating probe-pin combinations, such as star probes or rotary-swing probes, which method is applicable when the probe system forms part of or is coupled to the control system of a measuring machine wherein a self-centering probe of workpieces is possible. The calibration procedure employs a calibration standard having a plurality of probe-centering elements distributed over its surface and facing in different directions, the positional geometry of these elements being stored in the computer of the measuring machine. Each of the individual probe balls is successively introduced into a centering element which is accessible. Thereupon, the position of each ball-center point is determined in the computer, from the stored positional data and the pre-established diameter of corresponding probe balls.

11 Claims, 5 Drawing Figures

METHOD OF CALIBRATING PROBE PINS ON MULTICOORDINATE MEASUREMENT MACHINES

BACKGROUND OF THE INVENTION

The present invention relates to a method of calibrating probe pins which are mounted to self-centering work-contacting probe systems of multicoordinate measurement machines.

Measurement or probe systems of multicoordinate measurement machines are frequently provided with a plurality of probe pins (for example, in star-shaped probe-pin combinations), or with a rotary swing probe, and each probe pin carries a work-contact ball at its tip end. The coordinates of the center points of the balls of the individual probes, or the positions assumed by them after rotation, must be calibrated with reference to their mutual relative position if more than merely a single probe pin of the combination or more than one position of the swing probe is to be used for the measurement of the workpiece.

In the calibration process, the coordinates of the center point of each ball are determined with reference to a suitable calibration standard, for example, in the form of a cube or a ball, the same probe pin being moved into contact with the calibration standard from different sides, at least three times (cube) or four times (ball). Thus, in the case of a probe system having five probe pins, 15 to 20 probings are effected for the calibration, which is very time-consuming.

From publication S 60-21-002 d of the firm of Carl Zeiss, entitled "Mess-und Tastsysteme bei Mehrkoordinaten Messgeraeten" (Measurement and Probe Systems for Multicoordinate Measuring Instruments), it is known to use an angular probe in combination with a so-called trio of balls in order to expand the measurement range of multicoordinate measurement machines. To calibrate the probe pin in positions associated with two measurement ranges, a single probing of the ball trio is sufficient, provided that the involved probe system is of the self-centering variety. However, with this trio of balls it is not possible to simultaneously calibrate probe pins whose axial directions differ substantially from each other.

BRIEF STATEMENT OF THE INVENTION

The object of the present invention is to provide a simple method and apparatus which, in combination with measuring-probe systems, permits a rapid calibration of complex probe-pin arrangements or probe-pin positions which differ greatly from each other.

The invention achieves the foregoing object in the calibration of probe-pin combinations such as star-configurated probes or rotary-swing probes, when the involved probe system forms part of or is coupled to the control system of a measuring machine wherein a self-centering probe of workpieces is possible. The calibration procedure employs a calibration standard having a plurality of probe-centering elements distributed over its surface and facing in different directions, the positional geometry of these elements being stored in the computer of the measuring machine. Each of the individual probe balls is successively introduced into a centering element which is accessible. Thereupon, the position of each ball-center point is determined in the computer, from the stored positional data and the pre-established diameter of corresponding probe balls.

In the method of the invention, the calibration process is reduced to one probe contact per probe pin, thus leading to a considerable saving of measuring time in the measurement of complex work pieces which require probe-pin combinations with a plurality of different types of probe pins or a swing probe.

The expense necessary for implementing the invention is comparatively slight. It is only necessary to provide a special calibration standard which has several centering elements facing in different directions, each centering element being formed from surfaces which converge toward each other.

The centering elements of the standard must permit self-centering probe engagement and therefore consist, inter alia, of conical recesses, ball trios or cylinder trios, or are of a concave generally tetrahedral shape.

BRIEF DESCRIPTION OF THE DRAWINGS

The invention and several embodiments will be described in reference to the accompanying drawings, in which.

DETAILED DESCRIPTION

Figure 1:
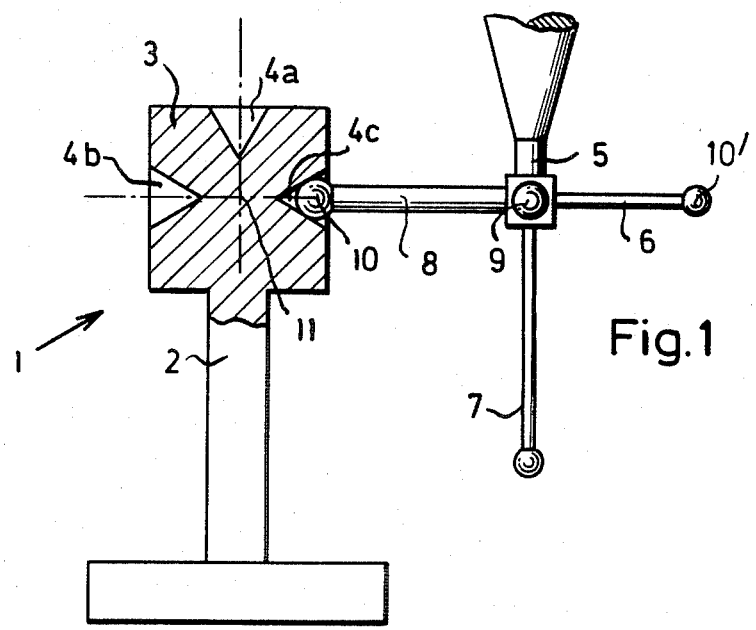
FIG. 1 is a view in elevation, party broken-away and in section, through a first embodiment of a calibration standard of the invention, in coaction with a multiple-pin probe forming part of a multiple-coordinate measuring machine having probe-centering capability.

In FIG. 1, a calibration standard 1 is shown to comprise a cube 3 secured via one side to a stand 2. Each of the remaining five sides of the cube has a concave conical formation, of which formations 4a–4b–4c are visible in the sectioned part of the drawing. The calibration standard 1 shown in the drawing is well suited for calibrating star-shaped probe-pin combinations, such as, for instance, the probe 5 shown in the drawing.

The process of calibrating the probe pins 6–7–8 of probe 5 will now be explained in detail.

The calibration standard 1 is first of all fastened to the table of a coordinate measurement machine having probe-centering capability. Thereupon, the position of calibration standard 1 is determined in the coordinate system of the machine, for instance by probing different sides of the standard with one and the same probe pin.

The positional geometry of the concave formations 4, i.e. the shape and relative position of the cone surfaces to each other, will have been thus determined by measurements, once and for all succeeding calibration procedures, the measurements being stored in the form of suitable parameters, such as axial directions, cone angles, etc., in the computer of the measurement machine.

In ensuing individual calibrating procedures, the ball end 10 of the probe pin 8 is introduced into the concavity 4c, the ball ends of the probe pins 7 and 6 are introduced into concavities 4a and 4b, respectively, and then the ball end of probe pin 9 is introduced into a further concavity (not shown) on the rear face of the cube 3; in each such probing contact, the closed-loop positioning controls of the measurement machine are used for automatic centering of the involved probe balls.

Before or after each probing process in which the position of probe pin 5 is measured as an absolute value in the coordinate system of the measurement machine, and in which the measured value is entered into the computer of the measurement machine, it will be understood that identifiers of the ball currently involved in a given probing (for example, the ball 10) and of the corresponding concave formation (i.e. concavity 4c) are also fed to the computer.

It will be seen that the computer is able to calculate the position of the center points of all probe balls in accordance with a pre-entered simple program, accounting for the diameter of the involved balls and the geometry and position of the concavities. And, since each probe ball is calibrated by self-centering engagement to a particular concavity, the probe-ball diameters may be different, as in the case of smaller ball 10' compared to larger ball 10.

Figure 2:
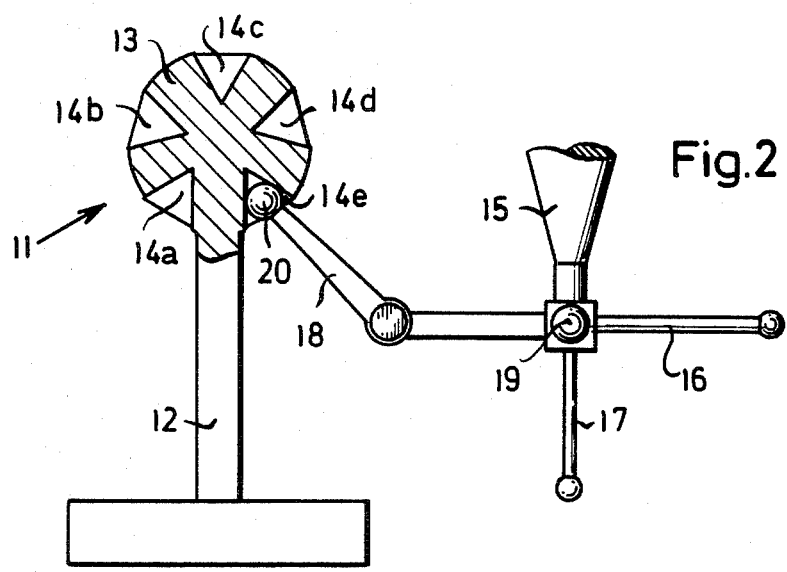
FIG. 2 is a similar view, partly broken-away to reveal a section through a second illustrative embodiment of a calibration standard.

The calibration standard 11 of FIG. 2 comprises a ball 13 fast to a stand 12. Ball 13 has nine centering concavities, facing outward in different directions. In addition to the concavity 14c, there are four further concavities, arranged in two vertically spaced planes; of these four, only two in each plane, namely the concavities 14b, 14d and 14a, 14e, respectively, are shown in the section of the drawing.

It will be appreciated that the calibration standard 11 of FIG. 2 enables the automatic centering of probe pins which are directed away from the workpiece table, such as, for example, the angularly swingable probe pin 18 of a probe 15, having ball 20 which is seated in the concavity 14e.

If, during the course of a given measurement on a workpiece, the probe pin 18 is swung against a workpiece (i.e. from the position shown), it may again be calibrated to the standard 11 by a single centering operation involving a different but then-accessible other one of the concavities 14.

Figure 3:
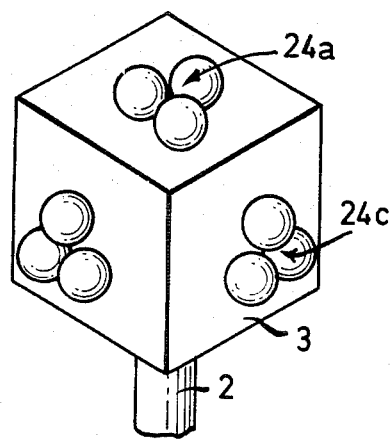
FIGS. 3, 4 and 5 are fragmentary views in perspective, to show alternative probe-centering element constructions usable in place of those shown in FIGS. 1 and 2.
Figure 4:
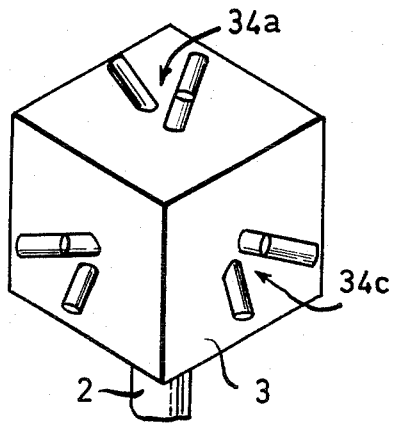
Figure 5:
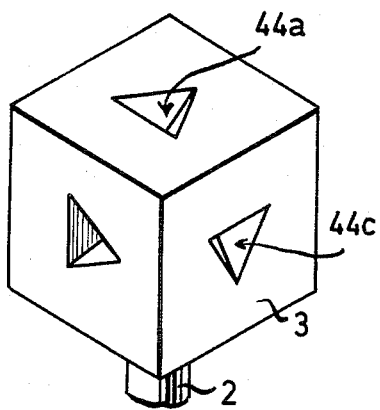

FIGS. 3, 4 and 5 illustrate alternative probe-centering element configurations, usable in place of the conical concavities 4(14) of FIGS. 1 and 2. In FIG. 3, each concavity 24 is effectively established by a cluster of three balls; in FIG. 4, each concavity 34 is effectively established by three spaced cylinders, in outwardly flared array; and in FIG. 5, each concavity 44 is characterized by three outwardly divergent flat triangular surfaces, as in the manner and relation of three of the four surfaces of a regular tetrahedron. In each case, self-centering probe-ball contact stabilizes via three fixed points of contact with the involved effective "cavity" region of the calibration standard.

What is claimed is:

1. A method of calibrating a probe having several probe pins with a probe ball at the end of each pin, wherein the probe is mounted to a self-centering probe-measurement system of a multicoordinate measurement machine, characterized by the fact that:
    (a) a calibration standard which has several centering elements formed of surfaces which converge towards each other is fastened to the measurement machine, said centering elements being distributed over the standard and facing in different directions,
    (b) the geometry of the centering elements (shape and distances apart) as determined by measurement is stored in the computer of the coordinate measurement machine, each centering element being imparted an identifier,
    (c) the orientation of the calibration standard is determined relative to the coordinate system of the measurement machine,
    (d) each of the balls of the various probe pins is introduced once in self-centering manner into a selected one of the centering elements,
    (e) the diameters or identifiers of the probe balls or ball used and the identifiers of the associated centering elements are fed into the computer, and that thereupon,
    (f) a program is called up which, on basis of the data and measurement values fed, computes the relative position of the center points of the probe balls with respect to each other.

2. A method according to claim 11, characterized by its use for the calibrating of probe-ball combinations having probe balls of different size.

3. A method according to claim 1, characterized by its use for the calibration of a swing probe.

4. In a calibration standard for the calibration of probe pins having probe balls at the ends thereof and which are fastened to self-centering probe-measurement systems of multicoordinate measurement machines, the improvement wherein the calibration standard has several centering elements facing in different directions and formed of convergent surfaces which permit the self-centering reception of probe balls of different diameters.

5. A calibration standard according to claim 4, characterized by the fact that the calibration standard has the shape of a cube, with at least one convergent-surface centering element on each of several of the surfaces of the cube.

6. A calibration standard according to claim 4, characterized by the fact that the calibration standard has the shape of a ball, with several convergent-surface centering elements in angularly spaced distribution over the surface of the ball.

7. A calibration standard according to claim 4, characterized by the fact that each of the centering elements is developed as an outwardly flaring conical cavity.

8. A calibration standard according to claim 4, characterized by the fact that each of the centering elements is developed in concave generally tetrahedron shape.

9. In a calibration standard for the calibration of probe pins having probe balls at the ends thereof and which are fastened to self-centering probe-measurement systems of multicoordinate measurement machines, the improvement wherein the calibration standard has a plurality of centering elements formed of convergent surfaces which permit the self-centering reception of probe balls of different diameters, each of the centering elements comprising three balls disposed in touching relationship upon the surface of a polyhedron.

10. In a calibration standard for the calibration of probe pins having probe balls at the ends thereof and which are fastened to self-centering probe-measurement systems of multicoordinate measurement machines, the improvement wherein the calibration standard has a plurality of centering elements formed of convergent surfaces which permit the self-centering reception of probe balls of different diameters, each of the centering elements comprising three cylinders extending at an angle from the face of a polyhedron, said cylinders converging toward said surface.

11. A method according to claim 1, characterized by its use for the calibration of a probe having plural probe pins extending in different directions with a probe ball at the tip of each pin.

* * * * *